April 30, 1946.  K. J. STIEFEL  2,399,266
VOLTAGE REGULATOR
Filed Aug. 21, 1944
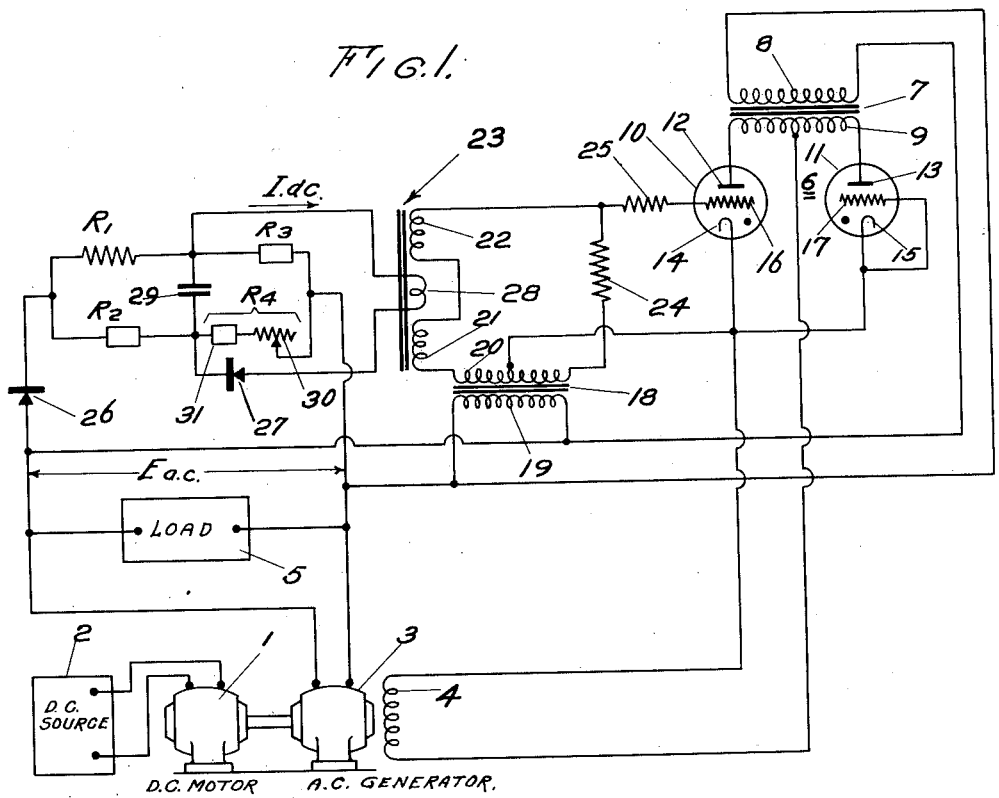
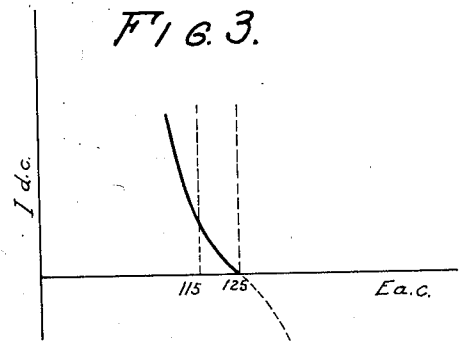
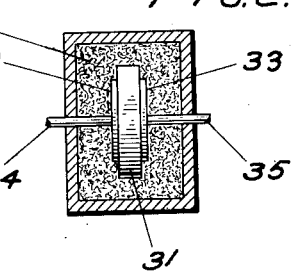
INVENTOR.
KARL J. STIEFEL,
BY
ATTY.

Patented Apr. 30, 1946

2,399,266

UNITED STATES PATENT OFFICE 2,399,266

VOLTAGE REGULATOR

Karl J. Stiefel, Waltham, Mass., assignor to Raytheon Manufacturing Company, Newton, Mass., a corporation of Delaware Application August 21, 1944, Serial No. 550,443

4 Claims. (Cl. 171—229)

This invention relates to a voltage regulator, and more particularly to a voltage regulating system of the type in which variations in the voltage delivered by a generator are counteracted by a compensating current supplied to the generator, preferably to a field coil thereof.

An object of this invention is to provide such a system in which the sensitivity to voltage variations is substantially increased.

Another object is to decrease the time lag of such a system and thus decrease hunting tendencies.

In systems of the type in which a motor, subject to wide variations in speed, as utilized to drive a generator, great difficulties have heretofore been encountered in controlling the output of the generator.

It is a further object of the invention to control the voltage of the generator of such a system within a predetermined limited range of variation regardless of wide variations in the speed of the driving motor.

The above and other objects and features of the invention will be made fully apparent to those skilled in the art from a consideration of the following detailed description taken in conjunction with the accompanying drawing in which:

Fig. 1 is a circuit diagram of a voltage regulating system constructed in accordance with this invention;

Fig. 2 shows a detail of one of the resistance elements used in the system of Fig. 1; and Fig. 3 shows a curve which illustrates an operating characteristic of the invention.

Referring to the drawing, reference numeral 1 indicates a motor which is supplied with current from a direct current source 2 and which drives an alternating current generator 3 having a field coil 4. The generator 3 supplies alternating current to a load 5. The field coil 4 is supplied with direct current from a full wave rectifier 6. Alternating current is supplied to the rectifier 6 from the output of the generator 3 by way of a transformer 7 having a primary winding 8 and a secondary winding 9. The outer ends of the primary winding 8 are connected across the load 5.

The rectifier 6 comprises a pair of controlled rectifier tubes 10 and 11. These tubes may be of the gas or vapor filled type having anodes 12 and 13 connected to the outer ends of the primary winding 9 and continuously energized cathodes 14 and 15. These cathodes may be thermionic filaments or any other suitable type. The cathodes 14 and 15 are jointly connected to one end of field coil 4 and the other end of this coil is connected to a center tap on the secondary winding 9 of the transformer 7. The tubes 10 and 11 are also provided with control electrodes 16 and 17 for controlling the firing thereof. One of the control electrodes, in the instance shown electrode 17, may be connected directly to its corresponding electrode 15. The other control electrode 16 is supplied with energization impulses from a circuit including a transformer 18 having a primary winding 19 connected across the output of the generator 3, and also having a secondary winding 20. The outer ends of the secondary winding 20 are connected together through a circuit including the windings 21 and 22 of a saturable reactor 23 and a resistance 24. The control electrode 16 is connected to the lead between the saturable reactor 23 and the resistance 24 through a resistance 25. The cathode 14 of the tube 10 is connected to a center tap on the secondary winding 20.

By the circuit just described, energization impulses are supplied to the control electrode 16 during that half wave of the alternating current cycle when the potential on the anode 12 is positive. The phase relation between the potential applied across the tube 10 and the energization impulse to the control electrode 16 will depend upon the value of the inductive reactance of the saturable reactor 23. If, for example, the reactance is low, then the energization impulse to the control electrode 16 will occur early in, or coincide with, the application of a positive potential to the anode 12 of the tube 10. The tube will fire and a major portion of a half wave of current will be supplied to the field coil 4 through the circuit including the left-hand side of the secondary winding 9, and the tube 10. If the reactance of the saturable reactor 23 is high, then the energization impulse to the control electrode 16 will occur later in the phase of the half wave of potential across the tube 10, and only a portion of the half wave of current will be supplied to the field coil 4.

In order to modify the inductive reactance of the reactor 23 and thereby shift the phase of the energization impulses to the control electrode 16, relative to the phase of the potential applied across the tube 10, I provide a bridge circuit including resistors $R_1$, $R_2$, $R_3$ and $R_4$. The resistors $R_1$ and $R_2$ are jointly connected to one side of the load through a rectifier 26, and the resistors $R_3$ and $R_4$ are jointly connected to the opposite side of the load. Resistors $R_2$ and $R_4$ are jointly connected through a rectifier 27 to one end of a coil 28 on the saturable reactor 23, and resistors $R_1$ and $R_3$ are jointly connected to the opposite end of said coil. Preferably a condenser 29 is connected across the lead between $R_1$ and $R_3$ and the lead between $R_2$ and $R_4$. The resistor $R_1$ may be of the usual type in which the resistance remains substantially constant with variations in the current therethrough or it may be of the type in which the resistance increases with increases in current. For example, it may be the tungsten filament of a lamp or a number of them. The resistors $R_2$ and $R_3$ are of a material the resistance of which rapidly decreases as the current therethrough is increased. Preferably these resistors are of the type having a non-linear, negative resistance-current characteristic. Suitable resistance elements for this purpose may be composed of a ceramic resistance material comprising graphite and silicon carbide. Such resistance elements known per se in the art, for example "Thyrite," have a hyperbolic resistance-current characteristic. The resistor $R_4$ comprises a variable resistance 30 and a temperature compensating resistance element 31. The element 31 is preferably of the same material as the resistors $R_2$ and $R_3$, but is heat insulated in a manner shown in Fig. 2 in which 31 indicates a thin disk of resistance material of the type described which is mounted between two conductive plates 32 and 33 and adapted to be connected in the circuit by leads 34 and 35 soldered to the disks 32 and 33, respectively, and extending through the walls of a box 36 of heat insulating material. The box 36 may be filled with any suitable material which is both a good heat and electrical insulator.

In the operation of the circuit just described, when the potential indicated as $E_{ac}$ across the load decreases from a predetermined value, say from 115 volts, the resistance of $R_2$ and $R_3$ is sharply increased, and the current $I_{dc}$ to the coil 28 of the saturable reactor 23 is greatly increased, as shown by the full line curve of Fig. 3. This current is in a direction tending to saturate the saturable reactor 23. Thus the reactor tends to become saturated earlier in the phase of the energization impulse from the transformer 18. The tube 10 fires and the circuit through the field coil 4 is closed earlier in the phase of the half wave of potential across the tube 10. The amount of current to the field coil is thus increased and the potential $E_{ac}$ across the load is increased. As $E_{ac}$ increases, the value of $I_{dc}$ decreases and the inductive reactance of the saturable reactor 23 opposing the energization impulse to the control electrode 16 is increased. Thus, the phase of the energization impulse is shifted relative to the phase of the voltage across the tube, the impulse lagging the voltage, and the tube 10 fires later in the phase of the half wave of voltage across the tube, and a smaller portion of the half wave of current is supplied through the field coil 4.

The arrangement described in the foregoing will maintain the value of $E_{ac}$ within narrow limits through wide variations in the potential of the direct current supplied to the motor 1 and regardless of wide variations in the speed at which the motor drives the generator. For example, in one embodiment of the invention, when the voltage of the source was varied through a range of from 85 to 150 v. the voltage across the load did not vary by more than about one per cent.

The total resistance of resistor $R_4$ may be altered by means of its variable portion 30, to control the voltage $E_{ac}$ at which the grid circuit is balanced and thus determine the normal value at which $E_{ac}$ is to be maintained and from which value $E_{ac}$ will vary only by small amounts. The value of the portion 31 having negative resistance-current characteristics may be small relative to the total resistance of $R_4$.

If the value of each of the resistors $R_1$, $R_2$, $R_3$ and $R_4$ varied in the same way with changes in ambient temperature, these temperature variations would not affect the operation of the bridge circuit. However, as previously described, the resistors $R_2$ and $R_3$ have negative resistance-current characteristics. The resistance of the most suitable materials for this purpose does not vary in the same way with changes in ambient temperature as does that of resistor $R_1$, and the portion 30 of the resistor $R_4$. For example, the resistance of silicon carbide decreases rapidly with increase in temperature, and such materials may be said to have negative resistance-temperature characteristics, as well as negative resistance-current characteristics. By the term negative resistance-temperature characteristics I mean that the characteristic resistance-temperature curve of the material has a negative slope. In the preferred material this curve is hyperbolic, like the resistance-current curve. The resistance thus decreases rapidly with an increase in temperature. In order to minimize variations in the value of the resistors $R_2$ and $R_3$, due to changes in temperature, these resistors are disposed in such a manner that heat generated therein is rapidly dissipated. The difference between their temperature and the ambient temperature is therefore small. By providing a small portion 31 of the resistor $R_4$ of the same material as resistors $R_2$ and $R_3$ so that variations with temperature of the resistance of this portion are in the same direction as the resistance-temperature variation of $R_2$ and $R_3$, and by heat-insulating this portion so that the difference between the temperature of this portion and the ambient temperature is higher than for $R_2$ and $R_3$, the temperature-resistance variations in both $R_2$ and $R_3$ are fully compensated. This is because the portion 31 is functioning at a steeper portion of its temperature-resistance curve than are resistances $R_2$ and $R_3$. Thus, although the ratio $$\frac{R_1}{R_2}$$

tends to increase with an increase in temperature, and although the value of $R_3$ tends to decrease with increase in temperature, the ratio $$\frac{R_3}{R_4}$$

is nevertheless increased by an increase in temperature due to the much larger decrease in $R_4$. Thus, any change in the ratio $$\frac{R_1}{R_2}$$

due to temperature variations, is matched by a corresponding variation in the ratio $$\frac{R_3}{R_4}$$

The use of the rectifier 27 in one of the connections between the bridge circuit and the coil 28 insures that the current to the coil is in one direction only, and this direction is such that the current tends to saturate the saturable reactor 23. In other words, it tends to decrease the inductive reactance of the reactor 23. The reactance is at a maximum when no current flows through the coil 28, and under these conditions the parameters of the circuit supplying energization impulses to the grid 16 are such that the energization impulse is so far out of phase with the alternating potential across the tube 10 that little or no current is supplied to the field coil 4 through this tube. Thus, the current supplied to the coil 4 is substantially only that supplied by the tube 11. It will be understood that the current supplied to the field coil by the tube 11 could be controlled in the same manner as the current supplied by tube 10. However, the range of control afforded by varying current through one tube will be sufficient in most applications of the invention to regulate the voltage across the load within any anticipated range of variations in the voltage of the source or in the demand of the load. No current flows to the coil 28 either when the bridge is balanced, or when it is unbalanced in such a direction that current flow through the coil 28 is prevented due to the rectifier 27. Without the rectifier 27 the bridge circuit would supply energy to the coil 28 of the reactor 23 whenever the bridge circuit becomes unbalanced due to either increases or decreases in $E_{ac}$. Changes in either direction would have the same effect and increases in $E_{ac}$ to a value sufficient to cause unbalance in the reverse direction, that is, in a direction reverse to the arrow, would cause continuously increasing current to be supplied to the field coil 4. The system is, therefore, operated in such a manner that only the values of $I_{dc}$ in one direction are utilized. These values are represented by the solid line portion of the curve of Fig. 3. Values of $I_{dc}$ in a reverse direction, represented by the dotted line portion of the curve, are not utilized. Thus, assuming that $E_{ac}$ is to be maintained at an approximate 115 volts, the parameters of the circuit are so chosen that at this voltage the bridge circuit is unbalanced and a current $I_{dc}$ flows in the direction of the arrow. At this value of $I_{dc}$ the tube 10 is conductive during a portion of the half-wave voltage thereacross. If $E_{ac}$ decreases, $I_{dc}$ increases rapidly and the tube 10 is conductive during the larger portion of the half-wave. If $E_{ac}$ increases, $I_{dc}$ decreases rapidly and the current through the tube 10 drops.

Without the rectifier 26, it will be seen that the current through the bridge circuit would reverse during alternate half-waves of the A. C. generator 3 since the relationship of the resistors 1, 2, 3 and 4 would be reversed if the current were permitted to go from right to left through the bridge circuit. The effect of an increase in $E_{ac}$ in this direction would be the reverse of its effect in the opposite direction. Thus, increases in current flowing from right to left through the circuit would cause an increase in $I_{dc}$ rather than a decrease in such a current.

While there has been herein described a preferred embodiment of the invention, other embodiments within the scope of the appended claims will be apparent to those skilled in the art from a consideration of the form shown and the teachings thereof. For example, it will be apparent that other means to control the voltage source from the energy derived from the bridge circuit may be used instead of the reactor 23 and the associated circuits. It will also be apparent from the teachings herein that the temperature compensating portion 31 of the resistor 4 may be associated with any of the other resistors $R_1$, $R_2$ or $R_3$ provided the slope of the resistance-temperature curve of the material 31 used for this purpose is non-linear and in a direction tending to compensate for the resistance-temperature variations of the other resistors.

What is claimed is:

1. In combination, a voltage source supplying a load circuit, a bridge circuit connected across said source, said bridge circuit having four arms each including a resistor, two of said resistors having negative resistance-current characteristics, another of said resistors having substantially constant resistance-current characteristics, and the fourth resistor having a small component of negative resistance-current characteristics and a large component having substantially constant resistance-current characteristics, said small component being heat insulated to compensate for temperature variations in the others of said resistors, said resistors being adapted to become unbalanced when the current therethrough differs from a predetermined value, and means responsive to the unbalancing of said bridge circuit to control the output of said voltage source.

2. In combination, a voltage source supplying a load circuit, a bridge circuit connected across said source, said bridge circuit having four arms each including a resistor, one of said resistors having a small component of negative resistance-current characteristics and a large component having substantially constant resistance-current characteristics, said small component being heat insulated to compensate for temperature variations in the other of said resistors, said bridge circuit being adapted to become unbalanced when the current therethrough differs from a predetermined value, and means responsive to the unbalancing of said bridge circuit to control the output of said voltage source.

3. In combination, a voltage source supplying a load circuit, a bridge circuit connected across said source, said bridge circuit having four arms each including a resistor, one of said resistors having a small component of negative resistance-current characteristics, said small component being heat insulated to compensate for temperature variations in the other of said resistors, said bridge circuit being adapted to become unbalanced when the current therethrough differs from a predetermined value, and means responsive to the unbalancing of said bridge circuit to control the output of said voltage source.

4. In combination, a voltage source supplying a load circuit, a bridge circuit connected across said source, said bridge circuit having four arms each including a resistor, one of said resistors having a small component of non-linear resistance temperature characteristics, said small component being maintained at a greater temperature difference relative to the ambient temperature than said other resistors, to compensate for temperature variations in the other of said resistors, said bridge circuit being adapted to become unbalanced when the current therethrough differs from a predetermined value, and means responsive to the unbalancing of said bridge circuit to control the output of said voltage source.

KARL J. STIEFEL.